United States Patent
Kuchmann-Beauger et al.

(10) Patent No.: US 8,935,277 B2
(45) Date of Patent: Jan. 13, 2015

(54) CONTEXT-AWARE QUESTION ANSWERING SYSTEM

(75) Inventors: Nicolas Kuchmann-Beauger, Paris (FR); Marie-Aude Aufaure, Chatenay-Malabry (FR); Raphael Thollot, Paris (FR)

(73) Assignee: SAP SE, Walldorf (DE)

( * ) Notice: Subject to any disclaimer, the term of this patent is extended or adjusted under 35 U.S.C. 154(b) by 13 days.

(21) Appl. No.: 13/434,899

(22) Filed: Mar. 30, 2012

(65) Prior Publication Data

US 2013/0262501 A1 Oct. 3, 2013

(51) Int. Cl.
*G06F 7/00* (2006.01)
*G06F 17/30* (2006.01)

(52) U.S. Cl.
USPC .................. 707/769; 707/771; 707/776

(58) Field of Classification Search
CPC .................................. G06F 17/30864
See application file for complete search history.

(56) References Cited

U.S. PATENT DOCUMENTS

| | | | |
|---|---|---|---|
| 5,966,686 A * | 10/1999 | Heidorn et al. | 704/9 |
| 6,076,088 A * | 6/2000 | Paik et al. | 1/1 |
| 6,714,939 B2 * | 3/2004 | Saldanha et al. | 1/1 |
| 6,741,959 B1 | 5/2004 | Kaiser | |
| 7,359,916 B2 | 4/2008 | Werner | |
| 2010/0235164 A1 * | 9/2010 | Todhunter et al. | 704/9 |

* cited by examiner

*Primary Examiner* — Loan T Nguyen

(57) ABSTRACT

A question is received to be answered by a question answering (QA) system. The question may be a business intelligence question that is expressed in a natural language. The question is parsed. The parsed question is matched to a pattern from a number of patterns. A technical query associated with the matched pattern is processed to retrieve data relevant to the question from a number of data sources. The QA system generates an answer to the question based on retrieved data. In one aspect, the QA system generates answers based contextual information.

14 Claims, 7 Drawing Sheets

CONTEXT-AWARE QUESTION ANSWERING SYSTEM

BACKGROUND

Information overload is an obstacle in information retrieval systems. Users are faced with the problem of choosing between many possible resources those likely to satisfy their needs. Typical question answering (QA) systems take as input a question posed in natural language and respond with an automatically generated answer. As opposed to search engines that return a list of documents, web pages, links, images, etc., among which the answer is yet to be found, QA systems determine a direct answer to the posed question. Conventional open-domain QA systems derive the answer from unstructured data, e.g. documents, text corpus, file collections, etc.

Business Intelligence (BI) generally refers to a category of software systems and applications used to improve business enterprise decision-making and governance. These software tools provide techniques for analyzing and leveraging enterprise applications and data. Such advanced tools require some technical knowledge on how to formulate queries in order to retrieve relevant data. Typically, BI systems are based on structured data such as business domain models. Querying data warehouses requires training, technical knowledge and cannot readily be done. To access data managed by BI systems users typically enter technical queries expressed in a specific language, e.g., Structured Query Language (SQL), SPARQL Protocol and RDF Query Language (SPARQL), Multidimensional eXpressions (MDX) language, and the like. Such technical queries are not natural to non-expert users and have to be manually built by the users. Translating an arbitrary BI question expressed in natural language into relevant formal representation that leads to correct answer is not a trivial task.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Figure 1:
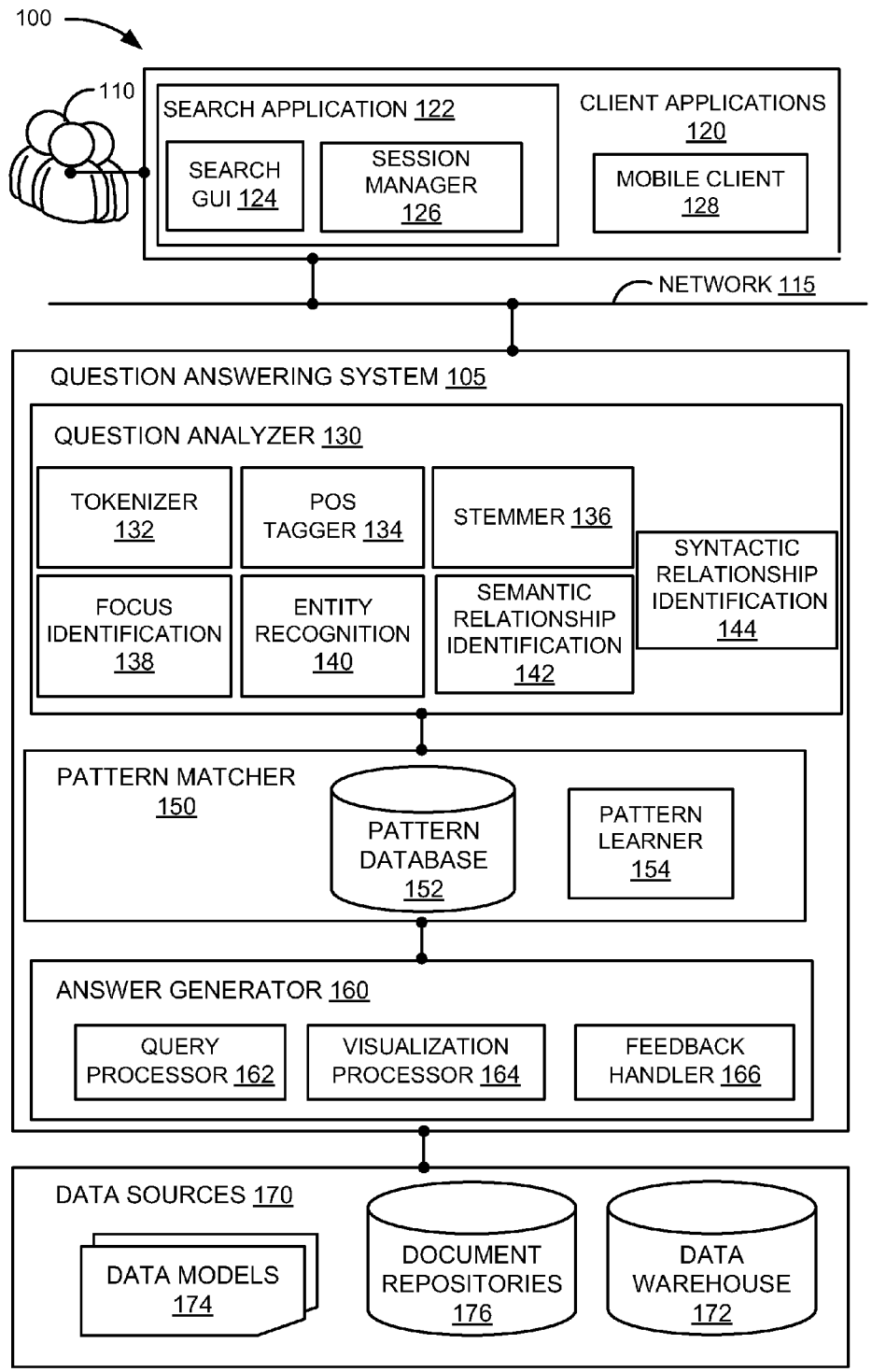
FIG. 1 is a block diagram illustrating a question answering system to generate answers to business intelligence queries, according to one embodiment.

Embodiments of techniques for context-aware QA system are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

In one embodiment, a QA system based on structured data is implemented. The QA system receives as input a question expressed in natural language and outputs a direct answer to the question. In one embodiment, questions may be users' queries expressed in natural language, e.g., "What is the capital of France?". A question may be any type of request for information. In one embodiment, a question may be a business intelligence (BI) query. Exemplary simple BI questions are "What are the sales in France in 2010?" or "Which store is best performing?". In one embodiment, the QA system generates answers to BI queries, where the answers to the BI queries are determined based on BI data.

Typically, BI tools exploit business data models to enable access to underlying data sources. These models enable users to access data stored in relational databases or Online Analytical Processing (OLAP) cubes. In one embodiment, the QA system is based on a semantic abstraction defined by business domain models. Semantic abstraction is the term for a semantic layer that describes an underlying base data source. A semantic abstraction can be a level of abstraction based on a relational, OLAP, or other data source or a combination of more than one existing semantic layers.

A universe is a specific form of semantic abstraction. A semantic abstraction includes data model objects and data foundation metadata that describes a connection to, structure for, and aspects of the underlying data source. A data model object is an object defined within a semantic domain. Data model objects describe the underlying data source and define dimensions, attributes and measures that can be applied to the underlying data source. A data model object represents a dimension of the underlying data source, represents relationships between dimension members and attributes, or provides calculations from, based on or designed to be applied to an underlying data source.

Typically, in a universe a data model object is assigned a common business term such that the user does not need to understand the specific logic of the underlying data source but can work with familiar terminology when constructing queries or otherwise accessing the data. End users can manipulate objects of these models, e.g., measures and dimensions, using common business terms such as "customer" or "revenue", rather than SQL or MDX queries. Technical queries as SQL or MDX may be automatically generated in response to the manipulation of business terms. Examples of common business terms include: customer, employee, product line, revenue, profit, attrition, fiscal year, quarter, and the like. In one embodiment, the QA system is based on BI semantic universe as knowledge representation of data sources based on which the QA system determines answers to posed questions.

Question Answering System

FIG. 1 illustrates exemplary system architecture 100 of question answering system 105 to generate answers to queries. In one embodiment, one or more of users 110 send requests for information to QA system 105 using client system 120. QA system 105 performs methods and techniques for responding to the requests sent by one or more of client applications 120. Client applications 120 may involve one or more entities operable to generate events dispatched to QA system 105 via network 115. Typically, the events received at QA system 105 correspond to questions posed by users 110, where the questions may be expressed in a free form and in natural language. In one embodiment, QA system 105 generates answers to business intelligence (BI) questions or queries.

A question may be one or more words that form a search term or request for data, information or knowledge that represent the answer or based on which the answer is constructed. A question may be expressed in the form of one or more keywords, e.g., "Sales revenue France". Questions may include various selection criteria and search terms. A Question may be composed of complex linguistic features, not only keywords, e.g., "What is the sales revenue in France in 2008?" However, keyword-based search for answer is also possible. In one embodiment, using unrestricted syntax for questions posed by users 110 is enabled. The use of restricted syntax results in variety of expression alternatives for users 110 to better state their needs. Questions that are BI queries may include business entities as search terms. BI entities may refer to any object defined in business data models 174, for example, measures and dimensions.

QA system 105 retrieves information from one or more data sources 170 to answer questions posed by users 110. In one embodiment, data sources 170 may include data warehouse 172, data models 174, and document repositories 176. Data warehouse 172 enables data storage and retrieval. In one embodiment, data warehouse 172 may be a storage mechanism that houses a standardized, consistent, clean and integrated form of data. The data may be sourced from various operational systems. Examples of operational systems from which data may be sourced include, but are not limited to, customer relationship management (CRM), enterprise resource planning (ERP), supply chain management systems (SCM), and the like. Data stored in in data warehouse 172 may be structured in a way to specifically address reporting and analytic requirements. In one embodiment, data warehouse 172 may be a relational database. In one embodiment data sources 170 may include one or more databases such as data warehouse 172.

In one embodiment, data models 174 enable access to data stored in data warehouse 172. Data models 174 may describe various business entities stored in data warehouse 172, and attributes, roles and relationships of the entities. In one embodiment, data models 174 may define a semantic abstraction of the underlying data kept in data warehouse 172. Examples of objects of data models 174 include, but are not limited to, measures, dimensions, members of dimensions, where a member represents a value of a dimension, hierarchies, functional dependencies, and the like. A dimension object may model a set of business entities of a common nature. A dimension may be a collection of related data members, which represents one aspect of a business, for example, "products" or "sales". Examples of typical dimensions include, but are not limited to, time, product, and geography. Dimensions may be organized into a basic parent-child hierarchy or a hierarchy of levels (e.g., OLAP hierarchies). For example, a geography dimension might include levels for continent, country, state, and city. In one aspect, a dimension may be an analysis function that provides means of "slicing" and "dicing" data in a data warehouse. A function of dimensions is to enable filtering and grouping. Another function is to provide structured labeling of otherwise unsorted numeric measures. In a universe, a measure may be a value, commonly numerical, that is derived from one or more dimensions. A measure may be a business entity that represents a set of values that have the same dimensionality and a common business meaning. Measures are numerical facts that can be aggregated against various dimensions. For instance, the measure "Revenue" may be aggregated on the dimension "Country" to retrieve the revenue in different countries.

Data warehouse 172 may be queried and explored by business entities defined in data models 174. In one embodiment, data models 174 may define multi-dimensional models that describe hierarchies of dimensions and functional dependencies between measures and dimensions. Multi-dimensional models may be OLAP cubes. A dimension in an OLAP cube is represented as an axis and measures are calculated within cells of the OLAP cube. An example of technical queries that may be executed over OLAP cubes is MDX. Business entities defined in a multi-dimensional model are in functional dependency if one determines the other. For example, the dimension "City" determines the related dimension "State". In one embodiment, QA system 105 is based on a universe defined by data models 174. Examples of such universes are SAP® BusinessObjects™ universes.

In some example embodiments, data sources 170 may include one or more document repositories 176. Examples of documents that document repositories 176 may store include, but are not limited to, reports such as Crystal Reports or OLAP Intelligence Reports, Desktop Intelligence Documents, and Web Intelligence documents. Other exemplary documents that may be kept in document repositories 176 include, but are not limited to, analytics, dashboards, workspaces, maps, scorecards, etc. In a further aspect, other documents include, but are not limited to, Excel Spreadsheets, Power Point presentations, Rich Text Format Documents, Text Files, documents in Adobe Portable Document Format, etc. In some example embodiments, documents kept in document repositories 176 reference business entities such as universes, information spaces, measures, dimensions, members of dimensions, etc. For example, BI reports may be composed of sections that include charts, tables, text, etc. Measures and dimensions may be associated in the same tables or charts. Such relationship between measures and dimensions or other business entities, imply a contextual and semantic relationship that may be of analytic interest to users 110. Another example is dashboards composed of various views or pages, where measures and dimensions may be associated in the same view or page.

In some example embodiments, client applications 120 include one or more components such as search application 122 and mobile client 128. Client applications 120 can operate on a variety of devices. Such devices include, but are not limited to, mobile and handheld devices, for example, laptops, mobile phones, personal or enterprise digital assistants, and the like; personal computers, servers, or other computer systems that access the services and functionality provided by QA system 105. For example, mobile client 128 may be an application installed on a mobile or other handheld device. Mobile client 128 dispatches query requests to QA system 105.

Search application 122 dispatches requests for information to QA system 105. Search application 122 is a client application to QA system 105. Search application 122 sends requests for answers to QA system 105. Search application 122 may be installed on a personal computer, a server or other computer system. In one embodiment, search application 122 includes graphical user interface (GUI) 124 and session manager 126. Users 110 may enter questions in GUI 124. GUI 124 may be a search box or other GUI component the content of which represents a question to be submitted to QA system 105. Users 110 may authenticate to QA system 105 via session manager 126. Session manager 126 keeps track of users 110 activity across sessions of interaction with the QA system 105. Session manager 126 may keep track of what questions are submitted within the lifecycle of a session of one of users 110. For example, session manager 126 may retain a succession of questions posed by a user of users 110 during a session. In one embodiment, answers produced by QA system 105, in response to questions of a user of user 110 posed throughout the course of the user's session, may also be retained. Information for sessions managed by session manager 126 may be shared between computer systems and devices.

In one embodiment, client applications 120 and QA system 105 are communicatively coupled through network 115, e.g. the Internet, intranet, or other public or private computer network. QA system 105 and client applications 120 may communicate by using Hypertext Transfer Protocol (HTTP) protocol via Representational State Transfer (REST) calls. In one embodiment, QA system 105 may reside on a server node. Client applications 120 may establish server-client communication with QA system 105 or vice versa.

QA system 105 responds to the requests for information sent by client applications 120, e.g., posed questions by users 110. QA system 105 generates answers to the received questions. In some example embodiments, QA system 105 may include question analyzer 130, pattern matcher 150, and answer generator 160. Question analyzer 130 is a computer module that analyzes the received questions. Question analyzer 130 performs various methods and techniques for analyzing the questions syntactically and semantically. Question analyzer 130 parses received questions. Question analyzer 130 may include various modules to perform analyses of received questions. Examples of computer modules that question analyzer 130 may encompass include, but are not limited to, tokenizer 132, part-of-speech (POS) tagger 134, stemmer 136, focus identification 138, entity recognition 140, semantic relationship identification 142, and syntactic relationship identification 144.

Tokenizer 132 is a computer module that performs lexical analysis. Tokenizer 132 converts a sequence of characters into a sequence of tokens. Tokens may be string of characters typed by a user and categorized according to rules as a meaningful symbol. Tokenizer identifies words boundaries in an input question and breaks the question or any text into its component parts such as words, multiword tokens, numbers, and punctuation marks. Tokenizer 132 reads in a string of characters, identifies the lexemes in the string, and categorizes them into tokens.

POS tagger 134 is a computer module that marks up a word in a text to correspond to a particular part of speech. POS tagger 134 reads a question or other text in natural language and assigns a part of speech to each word or other token. POS tagger 134 determines to which part of speech a word corresponds, based on the definition of the word and the context of the word. Context of the word may be based on its relationship with adjacent and related words in a phrase, sentence, question, or paragraph. In one embodiment, context of a word may be dependent on previously posed one or more questions. Examples of parts of speech that may be assigned to words include, but are not limited to, nouns, verbs, adjectives, adverbs, etc. Examples of other part of speech categories that POS tagger 134 may assign include, but are not limited to, comparative or superlative adverbs, wh-adverbs, conjunctions, determiners, negative particles, possessive markers, prepositions, wh-pronouns, and the like. POS tagger 134 tags or otherwise annotates tokens of a question with part of speech categories. In one embodiment, POS tagger 134 tags tokens or words of a question to be parsed by QA system 105.

Stemmer 136 is a computer module that identifies root, stem or base forms of words in a text. In one embodiment, stemmer 136 determines stem forms for tokens or words in a question received at QA system 105. Typically, questions posed by users 110 to be parsed by QA system 105 may include morphological variants of words that are derived from the same stem and share an abstract meaning. In one embodiment, stemmer 136 annotates words or tokens of received questions with corresponding stem or base form. Users 110 may express their information needs using different variants without being induced to include an exhaustive list of variants of words in order to retrieve accurate answers.

Focus identification 138 is a computer module that detects a category or a type of a question. Based on this determination, the question may be assigned an expected answer type (EAT) of the searched answer. In one embodiment, focus identification 138 determines the focus of a question to be parsed by QA system 105. The focus is a word or sequence of words that define the question and delineate it by indicating what answer the question is looking for. In one embodiment, the EAT of the question is the class of the expected answer. For example, in question "Which store has not sold which product category?" the focus of the question is the dimension "store". In some example embodiments, focus identification 138 may determine question type based on parts of the question such as "what", "who", "how", "where", "which" and the like. For example, questions starting with the wh-question word "who" may have as expected answer type a person. In one embodiment, focus identification 138 annotates questions received at QA system 105 with corresponding question focus.

Entity recognition 140 is a computer module that identifies or extracts entities in input text and classifies them according to type. In one embodiment, entity recognition 140 detects entities in a query or a question received at QA system 105 and classifies the entities into predefined types or classes. For example, "Canada" may be classified as an entity of type "COUNTRY", "John Paul" as an entity of type "PERSON", and "General Motors Corporation" as an entity of type "ORGANIZATION". Entity recognition 140 may identify entities using predefined set of entities types. In one embodiment, entity recognition 140 may also discover new or unseen entities. Examples of entities that entity recognition 140 may identify include, but are not limited to, names of people, companies, places, cities, countries, months, years, currency, dates, and the like. Entity recognition 140 classifies extracted entities by type and annotates words or tokens of questions received at QA system 105 with corresponding entity type. In one embodiment, entity recognition 140 annotates entities' position into a question.

In a further aspect, entity recognition 140 identifies terms in questions posed by users 110 that are defined in data models 174. In one embodiment, entity recognition 140 identifies business entities in the question corresponding to entities defined in a semantic layer. For example, in the following BI question: "Which store has not sold which product category?", entity recognition 140 may identify and annotate the business entity "store" as dimension "STORE", the entity "sold" as measure "SALES", and the entity "product category" as dimension "CATEGORY", where the business entities may be defined in one or more universes in data models 174.

An entity can be referred to in more than one way. For example, the "United States of America", "United States", "America", and "USA" are various ways to refer to the same country. In one embodiment, entity recognition 140 detects variations of the same entity. In one embodiment, entity recognition 140 may identify entities that are defined in external sources such as WordNet®. For example, entity recognition 140 may determine that two entities are synonyms, hyponyms, or the like. Such external sources may group English words into sets of cognitive synonyms each expressing distinct concept.

Semantic relationship identification 142 is a computer module that identifies semantic relationships of recognized entities in questions posed by users 110 to other entities defined in business data models (e.g., data models 174) such as a universe. In one embodiment, semantic relationship identification 142 may determine functional dependencies between entities, the dimension associated to a member, and other semantic relationships defined in data models 174 or external sources.

Syntactic relationship identification 144 is a computer module that identifies syntactic relationships in a question composed of tokens posed by users 110 to QA system 105. Syntactic relationship identification 144 determines the grammatical structure of sentences, for example, which groups of words are associated as "phrases" and which word is the subject or object of a verb. In one embodiment, syntactic relationship identification 144 conforms to a formal grammar.

Question analyzer 130 is a computer module that parses a received query and generates a corresponding data structure of the query. For example, in response to received question at QA system 105, question analyzer 130 outputs the question parsed as a data structure. The parsed question may be represented in the form of a parse tree or other graph structure. In one embodiment, the produced parse tree corresponding to the question may be implemented in Resource Description Framework (RDF). To generate the parsed question, question analyzer 130 may trigger computer modules 132-144. Question analyzer 130 can use functionality provided by computer modules 132-144 individually or in combination. Additionally, question analyzer 130 may use external computer systems for dedicated tasks that are part of the question parsing process. Examples of such external systems are WordNet®, Stanford Parser, and SAP® BusinessObjects ThingFinder™.

In one embodiment, question analyzer 130 outputs parsed question and pattern matcher 150 receives the parsed question as input. Pattern matcher 150 may include pattern database 152 and pattern learner 154. Pattern database 152 includes a set of predefined linguistic patterns. A pattern is a set of rules for recognizing character strings that share common features. Patterns are flexible means for, specifying, matching and recognizing strings of text. Regular expressions are an example of patterns. Patterns may also include sub-patterns. In one embodiment, patterns may be developed on demand and pattern database 152 may be expanded. Patterns defined in pattern database 152 may be associated with corresponding technical queries. In one embodiment, pattern database 152 may include pairs of patterns and corresponding associated technical queries. In one embodiment, a pattern of a question may be associated with predefined templates of technical queries. Once, a question to be answered is parsed by question analyzer 130, the parsed question is matched by pattern matcher 150 to a corresponding pattern included in pattern database 152.

If a question matches a pattern, then a technical query associated with the pattern is triggered to query data sources 170 to retrieve the answer. The triggered technical query takes as input tokens or other objects from the posed question. In one embodiment, technical queries are instantiated in response to matching a pattern to the user's question, and placeholders in the pattern are replaced with corresponding tokens or other objects from the posed question. Patterns associate questions expressed in natural language to structured technical queries. Through patterns users' questions are translated in any target technical language (e.g., SQL, MDX, and the like). In one embodiment, patterns may be implemented in SPARQL. Information to be matched in pattern may be represented in RDF, for example, the parsed question may be represented in RDF.

Answer generator 160 is a computer module that generates answers to posed questions. Examples of answers generated by answer generator 160 may include, but are not limited to, answers in the form of natural language sentences; reports, charts, or other analytic representation; raw data; web pages, and the like.

In some example embodiments, answer generator 160 may include query processor 162, visualization processor 164 and feedback handler 166. When a pattern and a parsed question are matched, a technical query associated with the pattern is executed by query processor 162. Based on retrieved data by a technical query executed by query processor 162, visualization processor 164 renders visualization of the retrieved data, where the visualization represents the answer. Visualization processor 164 may render various analytics to represent the answer including, but not limited to, charts, tables, dashboards, maps, and the like. In one embodiment, visualization processor 164 may be SAP® BusinessObjects Common Visual Object Modeler (CVOM). Another example is SAP® BusinessObjects Exploration Views providing dashboard and exploration capabilities of BI data. Visualization processor 164 presents the answer to the user in understandable form.

Feedback handler 166 is a computer module that processes feedback from users 110 on answers generated by answer generator 160. In one embodiment, users 110 may be engaged in dialog with the QA system 105 to evaluate the relevance of received answers. Answer generator 160 may produce a list of answers corresponding to a question submitted by a user of users 110. The user may rank each answer according to its relevance to the question. In one embodiment, the feedback of users 110 on generated answers may be used for pattern learning.

In one embodiment, pattern matcher 150 may also include pattern learner 154. Pattern learner 154 is a computer module that learns to match random input questions to corresponding one or more patterns or sub-patterns. Pattern learner 150 may utilize explicit feedback, as well as implicit feedback from users 110 to improve pattern matching.

In one embodiment, QA system 105 may use external computer systems for dedicated tasks that are part of the question answering processes. Also, QA system 105 may retrieve data from external data sources. Examples of external source systems include, but are not limited to, Lightweight Directory Access Protocol (LDAP) directories, operational systems, BI systems, social networks, etc.

Patterns

Figure 2:
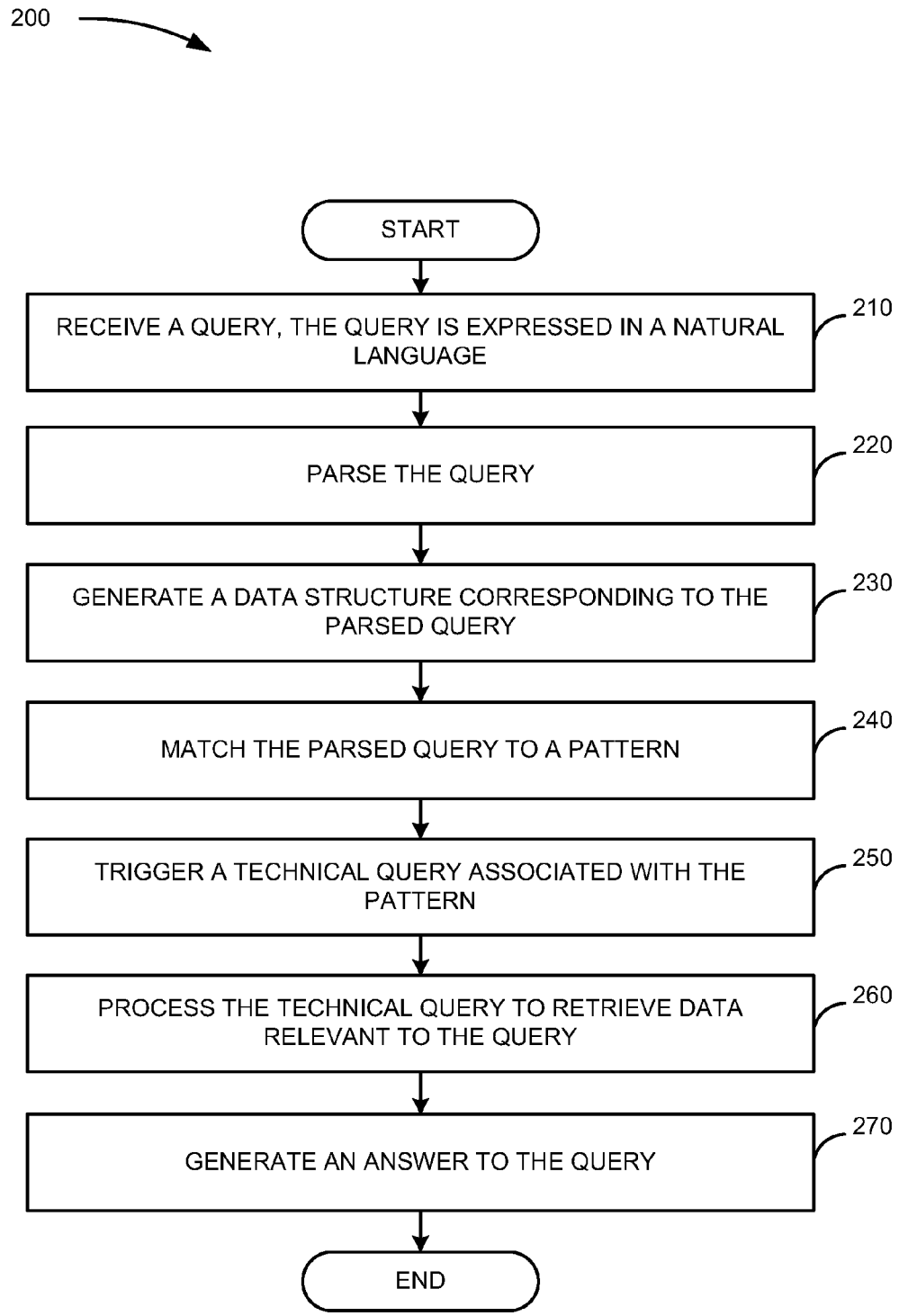
FIG. 2 is a flow diagram illustrating a process to generate answers to business intelligence queries, according to one embodiment.

FIG. 2 illustrates process 200 to generate an answer to a BI query, according to one embodiment. The process starts at 210 with receiving a query. The query may be expressed in natural language. Questions to be answered may be expressed in free form and may include various linguistic features, mistakes, ambiguities, etc. In one embodiment, the query is a BI question posed by a user. Table 1 below illustrates exemplary BI questions.

TABLE 1

| # | Question |
|---|---|
| 1 | Which store has not sold which product category? |
| 2 | How many orders per category have we generated? |
| 3 | How many orders have been generated in New York? |
| 4 | Where customers have not bought which product? |
| 5 | What is the revenue in France? |
| 6 | What product quantity was ordered in Chicago by quarter and what was the average for all quarters? |

At 220, the query is parsed. In one embodiment, methods and techniques for analyzing queries semantically and syntactically may be implemented. For example, various modules, such as, tokenizer 132, POS tagger 134, stemmer 136, focus identification 138, entity recognition 140, semantic relationship identifier 142, and syntactic relationship identifier 144 (FIG. 1), may perform analyses of received queries. In one embodiment, business entities are identified in the query, where the business entities correspond to entities defined in a semantic layer or other ontologies representing data sources (e.g., data models 174 in FIG. 1).

At 230, as a result of parsing the query, a corresponding data structure that corresponds to the parsed query is generated. The parsed query may be represented as a tree structure such as a parse tree. In one embodiment, the parse tree is a labeled tree graph. The parsed question may represent syntactic and semantic analysis of the received question. For example, nodes of the tree may represent various tokens or business entities, for example, measures, dimensions, attributes, members of measures, and the like. Edges of the tree represent relations between the entities. In one embodiment, the generated tree structure may be implemented in RDF. The RDF tree may represent entities identified in the received question and relations between these entities in the form RDF triples. Examples of relations between entities include, but are not limited to, a "member of" relationship representing that one node is a member of another node that is a dimension, "belongs to" representing that one node is an attribute that belongs to another node that is a dimension, "has annotation" representing that one node is annotated syntactically or semantically, and the like. In one aspect, nodes of the tree may also correspond to patterns for capturing linguistic features. Examples of linguistic features that may be captured by such patterns include, but are not limited to, the negation "not", a range indicated by the word "between", a selection criteria "all" or "my", and the like.

At 240, the parsed query is matched to a pattern from a number of patterns. To translate the received BI query to a machine-readable query, e.g., a technical query, the parsed query is matched to patterns such as patterns kept in pattern database 152 in FIG. 1. Through patterns, arbitrary BI questions expressed in natural language are translated into relevant formal representation that leads to correct answer. Questions in general and in particular BI queries may exhibit and involve various features. A pattern specifies features of the questions. Examples of features represented in patterns may include, but are not limited to, tokens, wh-question words, parts of speech, lemmas, business entities or objects and semantic relationships. From another perspective, a feature may also be the succession of tokens within the question. In one embodiment, a lemma feature may represent the verb "to be" (e.g., LEMMA (be)). To illustrate, the exemplary question "Which store has not sold which product category?" include as features: the subject that is the EAT expression "which store", where the EAT is the dimension "store", then a negation "not" follows, the measure "sales" identified from the token "sold" represents the predicate in the question, and the dimension "category" represents the object in the question. The exemplary question may be matched to a pattern with the following exemplary structure:

(EAT expression as subject) (negation)
(MEA expression as predicate) (DIM expression as object)

In the above exemplary pattern structure, "MEA" stands for a measure and "DIM" stands for a dimension. Patterns may specify various constraints to be matched by concrete questions. Another exemplary BI question is "What is the revenue in Germany?" The exemplary question may be matched by the following pattern:

Pattern (1): ˆREL(WHQ, LEMMA(be)) SL(MEA)+ REL(TOKEN(in), SL(MEM))*

Syntax of Pattern (1) is adopted for illustrative purposes. Technically patterns may be implemented in various programming languages and scripts, including SPARQL. In Pattern (1): "WHQ" represents a wh-question word such as "what"; "LEMMA(be)' represents the verb "to be" such as "is"; "REL(WHQ, LEMMA(be))" represents relationship between two tokens, for example, that the wh-word and the verb "to be" are in succession; "SL(MEA)" represents an entity defined in the semantic layer (SL), where the entity is a measure such as "revenue"; "TOKEN(in)" represent a token that is the preposition "in"; "SL(MEM)" represents an entity defined in the semantic layer (SL), where the entity is a member such as "Germany".

In one aspect, a pattern may be divided logically into three abstract levels: the token layer representing identified tokens and parts of speech; the syntactic layer representing structure of the sentence including corresponding succession or order of tokens; and the semantic layer representing entities and relationships between entities defined in the corresponding ontology. Table 2 below illustrates the logical structure of an exemplary pattern.

TABLE 2

| semantic layer | ontology entities | | triples | | |
|---|---|---|---|---|---|
| | "US": SL(MEM(#1)) | | SEM(TOKEN(#1), hypo, @Place) | | |
| syntactic layer | token succession | | | | |
| | "what are": REL(WHQ, LEMMA(be)) "in 210": REL(TOKEN(in), SL(MEM)) | | | | |
| token layer | Token | POS lemma | | wh-word | DB model objects |
| | "what": WHQ | "are": LEMMA(be) | | | "2010": SL(MEM) |

In one embodiment, a pattern may include one or more sub-patterns. For example, when exact matching of the input question to a pattern is not possible, partial matching of patterns is invoked. Partial matching of patterns involve matching sub-patterns, that are part of defined patterns, and producing technical queries that correspond to the longest matched sub-pattern. Sub-patterns are patterns within patterns. Thus, a pattern can refer to already defined patterns. For example, in Pattern (1) it may be desirable that "REL(WHQ, LEMMA(be))" is represented as distinct sub-pattern since numerous questions may contain that structure, for example, the sub-pattern may be defined as PATTERN(wh_be). Another sub-pattern of Pattern (1) that may be defined is PATTERN(in_filter) that represents a filter expression such as "in Germany". In one embodiment, a pattern may involve nested sub-patterns. Sub-patterns allow for partial matching of questions. Pattern (2) below represents Pattern (1) with defined sub-patterns:

Pattern (2): PATTERN (wh_be) SL (MEA)+PATTERN (in_filter)

An entity can be referred to in more than one way. For example, the "United States of America", "United States", "America", "US" and "USA" are various ways to refer to the same country. In one embodiment, patterns may represent different feature types for the same one or more tokens in questions. For example, an ontology representing geographic data may include the following triples:

('US', is Variant, 'USA')
('USA', is A, 'Country')
('USA', is A, 'Place')

A pattern may describe on one hand, that "US" is a token in an input question such as "What is the revenue in US?", and on the other hand that it is hyponym of both "Country" and "Place", as defined in the ontology. In one embodiment, in a pattern, a reference can be made to the same token and different features may be assigned to the token. In Table 2, a reference is represented by the symbol "#" followed by the number of reference, e.g., "#1".

At 250, a technical query is triggered, where the technical query is associated with the pattern that matches the received query. For example, the received query may be the exemplary question "What is the global revenue in Tokyo". This exemplary question may be matched by Pattern (1). Template (1) below represents an exemplary template of technical query that may be associated with Pattern (1):

Template (1): SELECT MEA#1 {, MEA#1}*
FROM table_of (MEA#1, MEM#1)
WHERE
dim_of (MEM#1)='MEM#1' {OR 'MEM#1'}*;

In Template (1), "MEA#1" indicates the first reference to a measure in the associated Pattern (1). Further, "{, MEA#1}*" captures all measures identified in Pattern (1). The "dim_of" function returns the dimension that is associated to a member as defined in data models (e.g., data models 174 in FIG. 1). At 260, the technical query is processed to retrieve data relevant to the query. The triggered technical query is processed by replacing placeholders with corresponding tokens or other objects from the received query. Technical templates and respectively technical queries are defined to as a combination of one or more constraints such as projections, filters, sorting criteria clauses, truncation clauses, and the like. In one embodiment, Template (1) may be translated in the following technical Query (1), where the technical Query (1) represents the received query:

Technical Query (1):
SELECT amount FROM Revenue WHERE City='Tokyo';

In technical Query (1), entities "Revenue" and "Tokyo" from the input question are replaced in Template (1) to retrieve relevant to the query data. At 270, based on the retrieved data, an answer to the received query is generated. For example, Table 3 below represents an exemplary dataset generated in response to executing the technical Query (1).

TABLE 3

| City | Days | Revenue |
|------|------|---------|
| Tokyo | 33 | 16720 |

Usually, the context of a user changes during user's interactions with systems and applications. Context may refer to any information that may be used to characterize the situation of an entity, e.g., location, identity, activity, time information, etc. An entity may be anything considered relevant to the interaction between a user and an application, including, but not limited to, time, place, person, the user and the application themselves, etc. A situation may be a collection of states of entities relevant to an interaction between the user and the computer system environment.

Typically, changes of a user's context results in changes in the user's needs for information and vice versa, the user's needs may also affect the user's context. The precision and relevancy of an answer to a user's query may also depend on the current user's context or situation. In one embodiment, the QA system enables direct and accurate answers by utilizing contextual information into the answering process. In one embodiment, the QA system may dynamically adapt to current user's actions and enable context-aware answers. The QA system generates answers to BI queries that are adapted to the user's context or situation. In one embodiment, a QA system may be integrated to a situational recommender system to enable context-aware recommendation of answers to users' questions.

Situational Recommender System

Figure 3:
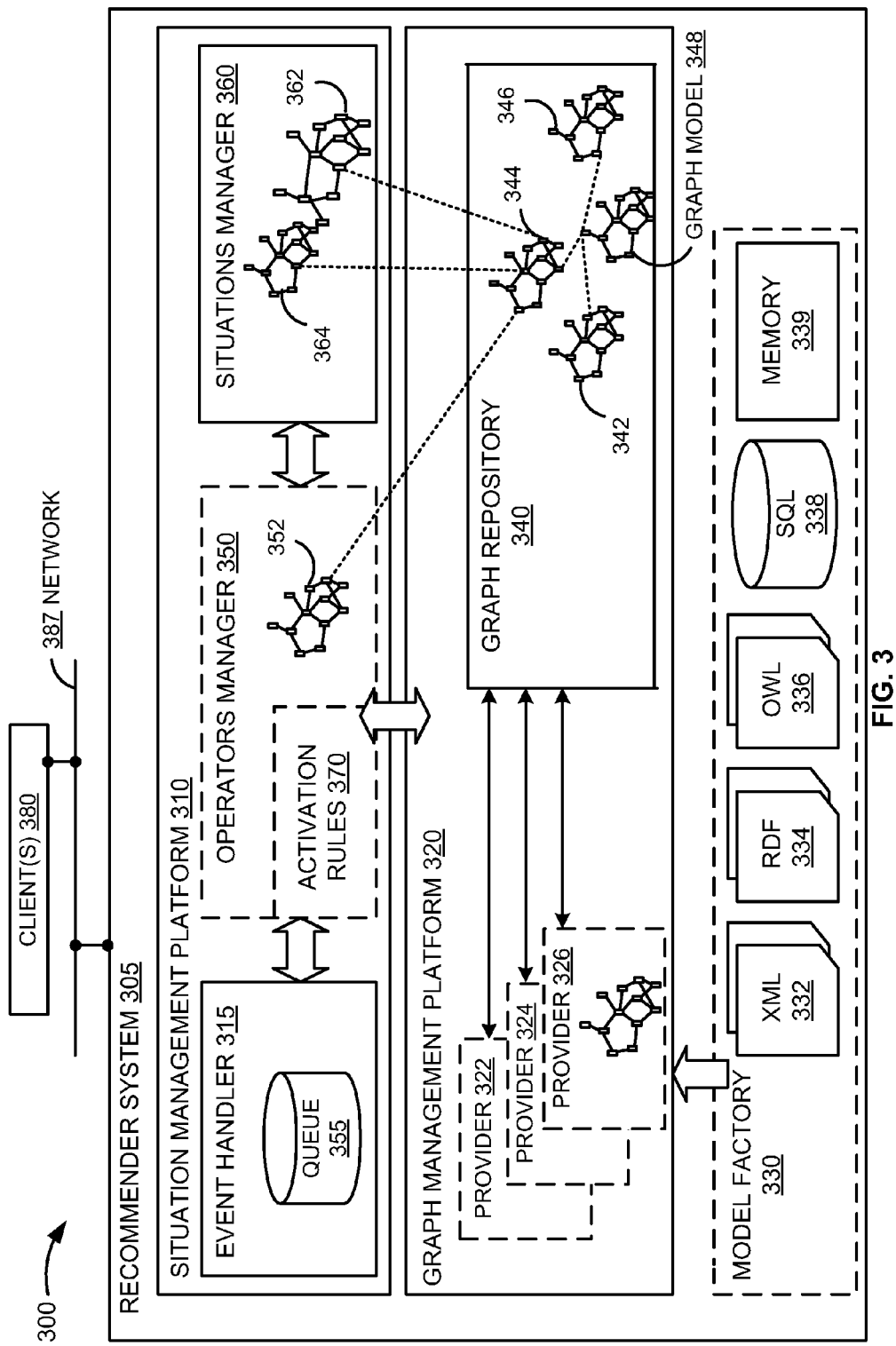
FIG. 3 is a block diagram illustrating a system architecture of situational recommender system to recommend heterogeneous resources, according to one embodiment.

FIG. 3 illustrates exemplary system architecture 300 of situational recommender system 305 to recommend heterogeneous resources, according to one embodiment. In a heterogeneous system environment, it may be advantageous to enable recommendations of heterogeneous resources available in the environment. A resource may be an entity, physical or abstract, that may be recommended. In an embodiment, a resource refers to an identified object that may be accessed, located or is otherwise available. Further, a resource may be assigned or identified by a Uniform Resource Identifier (URI). For example, depending on the context, a user may receive automatically generated recommendations including references to a customer from a CRM system, an application or tool on a company's Intranet, a workflow to follow, other employees or contacts, etc. In one aspect, examples of recommendations generated by situational recommender system 305 may also include, but are not limited to, recommendations of candidate answers to natural language questions, recommendations for question reformulation in case of ambiguity, and recommendations for candidate questions to be posed.

A situational system may be defined as a system that, based on a user's situation, provides relevant resources to the user. In one embodiment, a situation may be implemented as a collection of situation statements. A situation statement describes a relation between at least two resources. Situation statements may be expressed as one or more tuples representing assertions. Each assertion may be formed by a subject "S", a predicate "P" and an object "O"—(S,P,O). For example, in the statement "Maggie reading document 1", Maggie is the subject "S", document 1 is the object "O" and "reading" is the predicate "P". The predicate "P" qualifies the relation between "S" and "O" and defines its semantics. In one embodiment, situation tuples (S,P,O), may be extended to include additional metadata "M", e.g., specifying temporal restrictions, privacy settings, level of confidence, accuracy, etc. In such a case, a situation statement may be expressed by one or more tuples (S,P,O,M), where M=(origin, t, l, s, c).

In this equation, "t" is a timestamp indicating when the situation statement was generated; "l" is expected lifetime or validity period of the situation statement; "s" is an ownership and privacy setting indicating who owns the situation statement and whether it is public, private or has custom access authorizations; "origin" indicates which system or user has created the situation statement; and "c" shows the level of confidence or other type of ranking indicating the level of accuracy, quality, completeness, or reliability of the situation. In one embodiment, other types of metadata may be integrated to situation tuples, including another related tuple.

Recommender system 305 is connected to client(s) 380 via network 387 and includes situation management platform 310, graph management platform 320, and model factory 330. Model factory 330 includes data sources for the recommender system 305. Model factory 330 may encompass data sources, including but not limited to, XML files 332, RDF files 334, Ontology Web language (OWL) files 336, SQL database 338, or memory 339. Data sources of model factory 330 such as XML 332, RDF 334, OWL 336, SQL 338, and memory 339, store raw data of available resources. The model factory 330 enables storage and retrieval of a number of available heterogeneous resources. In one embodiment, data sources of model factory 330 may be distributed across one or more source systems that are either internal or external to recommender system 305, or both. These systems may communicate over public or corporate networks, e.g., network 387. Examples of source systems include, but are not limited to, a Lightweight Directory Access Protocol (LDAP), a CRM system, BI platform, social network, etc.

In one embodiment, the data sources 332-339 included in model factory 330 are communicatively coupled to graph management platform 320. The graph management platform 320 describes the heterogeneous resources available at data sources 332-339 available in model factory 330. Further, the graph management platform describes existing relations between the resources 332-339, e.g., in a graph-based data model, to enable uniform data representation.

Graph management platform 320 includes providers 322-326 and graph repository 340. Providers 322-326 are added to graph management platform 320 to connect to one or more corresponding data sources 332-339 available in model factory 330. In one embodiment, each provider 322-326 is customized to communicate with respective data source included in model factory 330. For example, a BI provider may be customized to communicate with a BI platform or a social provider to connect to LDAP.

Providers 322-326 may specify how to access and retrieve data from the corresponding data sources accessible through model factory 330. For example, a data source may be a BI data warehouse such as SQL database 338 and a provider from providers 322-326 may specify logic to query or modify data in the BI data warehouse using SQL requests. Similarly, a provider from providers 322-326 may be modeled to query RDF files 334 using SPARQL language. SPARQL is used to extract information from RDF files, RDF Site Summary (RSS), and the like.

In one embodiment, providers 322-326 connect graph repository 340 to data sources such as data sources 332-339. As illustrated, exemplary graph repository 340 may include graph model 348 and graphs 342-346. In one embodiment, graph model 348 is a general model of resources available through model factory 330. The graph model 348 may include nodes corresponding to or describing resources, and edges to represent relationships between the resources. In one embodiment, graph model 348 may be implemented as a base schema using Resource Description Framework Schema (RDFS) language. Building and maintaining a complete graph of available resources may be inefficient or infeasible, e.g., due to performance reasons, computational costs, technical limitations, and the like. Additional graphs, such as graphs 342-346, may be added to graph repository 340 on a per-need basis by extending graph model 348.

In one embodiment, graph model 348 serves as a base model that may be further extended by providers 322-326. Each provider 322-326 may register at graph repository 340 to retrieve and extend graph model 348 with specific nodes and relations defining corresponding graphs 342-346. Each provider 322-326 may connect to a corresponding data source from model factory 330 to retrieve available resources provided by the respective data sources 332-339. Providers 322-326 may populate the retrieved resources to their corresponding graphs 342-346. For example, a BI provider may populate and extend graph model 348 to describe measures and dimensions of a business domain, and their mutual dependencies.

In one embodiment, each graph 342-346 is built based on graph model 348 by at least one corresponding provider from providers 322-326. Graphs 342-346 may be implemented as extended schemas of the schema of graph model 348. Graphs 342-346 may further include specific nodes and edges defined in accordance with respective data sources 332-339. In one embodiment, each graph 342-346 is specific to a particular data source available in model factory 330 and is built upon graph model 348 to model and represent resources provided by the corresponding data source.

The nodes and edges of graphs 342-346 may represent resources and relations between these resources, accordingly. In one embodiment, one or more nodes and edges of graphs 342-346 correspond to resources provided in model factory 330 that are identified by URIs. The complete graph of graph repository 340 is defined by merging the schema of graph model 348 with extended schemas of graphs 342-346 that are built by their respective providers 322-326. Therefore, graph repository 340 may be described as an aggregation of several partial graphs 342-346.

In one embodiment, graph management platform 320 maintains graph models to enable uniform representation of heterogeneous data resources and relations between the data resources available in model factory 330. Furthermore, model factory 330 may be extended by adding new data sources. Based on these new data sources, new providers may be built and added to graph management platform 320 to retrieve data resources available through the new data sources.

Situation management platform 310 manages users' situations occurring during the interactions between client(s) 380 and recommender system 305. Client(s) 380 may be one or more entities, including users and client applications, operable to generate events dispatched to recommender system 305 via network 387. An event may refer to an interaction between at least two data resources and may be described as a specific type of situation statement, where the interaction is represented by the relation between the resources. For example, interactions between users and other available resources, such as "Maggie reading document1", "John has meeting with Maggie", etc., define corresponding events. In one embodiment, events may be time-dependent situation statements that are valid for a given period of time, as opposite to other situation statements that describe static relations between resources. An event may be either external to recommender system 305, e.g. dispatched to recommender system 305 by client(s) 380, or internally raised within recommender system 305.

Situation management platform 310 includes event handler 315, operators manager 350 and situations manager 360. Situation management platform 310 receives events to be processed. In one embodiment, the processing of an event may result in long running operations. Therefore, event handler 315 adds the received events to queue 355 to be prioritized and processed asynchronously.

Situations manager 360 monitors situations of entities that are relevant to events received or generated at recommender system 305. In one embodiment, a situation is collection of related situation statements or tuples. Situation graphs 362-364 represent monitored situations in the form of a graph. A situation graph can be defined as a collection of valid situation statements that are represented in the form of a graph. In one embodiment, a situation graph represents a user's situation at a certain point in time. In one embodiment, the collection of situation statements or tuples, that constitute a situation, are arranged in situation graphs. For example, the subject "S" and the object "O" of a tuple may be represented as nodes and the predicate "P" may be represented as an edge between the nodes of "P" and "O".

In one embodiment, as an event is dispatched to or otherwise detected by recommender system 305, situation manager 360 starts to monitor situations impacted by the event. Initially, impacted situations may be situations of the subject "S" and/or the object "O". For example, in one embodiment, once a user authenticates to recommender system 305, situations manager 360 retrieves a list of relevant to the user situation statements, where these situation statements constitute the user's current situation graph. Thus, the user's situation is loaded to situations manager 360. When recommender system 305 starts to monitor the situation of a user or an agent, e.g. when an event concerning this user or agent occurs, the agent's situation graph is initialized based on previously stored situations that are still valid. An agent is a resource present in the recommender system 305 that may generate a situation statement. In one embodiment, the "origin" attribute of a situation statement indicates the agent that has created the statement. Examples of agents include, but are not limited to, providers, users, client applications, operators designed to perform various operations on situations, e.g., updating situations in response to events, etc. In one embodiment, situation manager 360 keeps graphs of monitored situations, such as situation graphs 362-364, in a cache. In yet another embodiment, situation manager 360 initialize situation graphs 362-364, on a per-need basis, from situation statements retained in graph repository 340. Situation graphs may be retrieved at situation manager 360 by querying graph repository 340.

Activation rules 370 are designed to react to specific events and, if certain conditions are met, to trigger additional processing in response to the events. One or more particular rules from activation rules 370 may be tailored to react to one or more specific events or event types. For example, one rule may be specified to react to events of type "a user is interacting with unstructured document". In one embodiment, a rule may be defined that reacts to receiving of questions posed to the QA system.

Operators 352 available in operators manager 350 are used to manipulate situations by adding, deleting or updating situation statements or tuples. Operators from operators manager 350 may define any operation that may be applied on graphs from graph repository 340 or situations graphs monitored in situation manager 360. An operator is a module that takes as input an event and a situation, and returns the situation updated to reflect the event and/or information that is generated as a result of the operator's processing. Operators may be used to maintain and perform operations on situation graphs. For example, operators may add, delete or update nodes and/or edges of situations graphs. In one embodiment, operators may assign values to blank nodes of graph models available in graph repository 340, based on received events.

Recommendation operator is a specific kind of operator. A recommendation operator may add a recommendation situation statement to a situation graph managed by situations manager 360. For example, a recommendation statement may be "Recommender 1 recommend productX". In one embodiment, based on added recommendation statements by recommendation operators, relevant resources are suggested to users. Recommendations may be represented via a "recommend" predicate. In one embodiment, to integrate a QA system to the recommender system 305, a "QA" operator may be developed. Answers to questions may be represented as recommendations generated by the "QA" operator. For example, the QA operator may add statements such as "QA recommend answer1". In one embodiment, the QA system may be represented as a combination of one or more operators. For example, one operator may be a question analyzer (e.g., question analyzer 130 in FIG. 1) that parses questions expressed in a natural language. Another operator may be a pattern matcher (e.g., pattern matcher 150 in FIG. 1) that matches the parsed question to corresponding pattern to translate a natural language question to technical query. Additional operator may also be an answer generator (e.g., answer generator 160 in FIG. 1) that processes the technical query and generates an answer to the question. From another perspective, other types of operators include, but are not limited to: stemming operator that may reduce words of unstructured documents to their roots so that different grammatical forms of the same words are identified; expiry checker to determine outdated situation statements and to remove them from situation graphs; consistency checker to resolve conflicting situation statements to ensure coherent context, NER operator, and the like.

Once, an event from queue 355 conforms to conditions of at least one activation rule from activation rules 370, it is further determined what operator available in operators manager 350 applies in response to the interpretation of the event. More than one activation rules from activation rules 370 may be used to trigger the same operator under different conditions. Thus, reusability of operators already developed is possible.

Recommender system 305 exposes methods to client(s) 380, to enable interaction of client(s) 380 with the recommender system 305. Examples of such methods include, but are not limited to, authentication, situation retrieval, and event posting. In some example embodiments, such methods may be implemented as REST services. For example, a user may authenticate to recommender system 305 via a GET method such as a method "/auth". This method may take as input users' login and password information and return as output a token that corresponds to users' sessions. This token may be required by further requests for interaction with the recommender system 305. Thus, recommender system 305 conforms to data security and role-based access to heterogeneous resources provided by various source systems that impose respective security controls.

Once a user is authenticated, client(s) 380 may retrieve the user's situation via a GET method such as a method "/situation". This method may take the token as parameter and return a list of statements that constitute the user's situation. In one embodiment, additional parameters may be used to filter retrieved statements to avoid unnecessary information retrieval. Another method exposed by recommender system 305 may be posting of events. For example, client(s) 380 send events to recommender system 305 via POST method such as a method "/event". The POST method may represent the event in RDF, where the representation may conform to graph model 348.

Various predicates may be defined to represent semantics of data sources as well as users' situations and context information. In one embodiment, predicates that represent users' preferences may be defined. Predicates that may represent users' preference include, but are not limited to, "prefers", "likes", doesNotLike", and the like. Users' preferences are represented as preference situation statements via preference predicates. In one embodiment, preferences may be explicitly generated by a user, for example, the user may rank recommendations or other resources. A user may also rank generated answers to questions. In one embodiment, ranked statements of recommended answers are added to the situation management platform as situation statements, with corresponding level of confidence attributed to the statements. In another embodiment, preferences may be derived by analyzing users' activities and history data. Derived preferences may have lower level of confidence than explicit preferences.

In one embodiment, predicates that represent geographic and time contextual information are defined. Predicates that represent geographic and time information include, but are not limited, to "hasLocation", "is Near" predicated that represents relative information, and the like. For example, the "hasLocation" predicate can be used to describe the user's location in statements like "Maggie hasLocation (46.217, 6.561)" or "Maggie hasLocation India". The object "O" of such statements if a node of type "Geography". Geographical nodes of different types may be used to describe geography information at different granularity levels (e.g., country, region, city, etc.). Geographic and time contextual information is represented as statements with such predicates.

Time information is represented as metadata associated with each situation statement. Generated statements are kept in graph repository 340 and may represent context history information. Their associated time-related attributes enable reconstruction of user's situation graph. Context history information may be retrieved from graph repository 340 by querying it. A user's situation graph may be reconstructed for a specific period of time. Recommender system 305 maintains a current situation graph of users' situation to represent currently relevant contextual data. In one embodiment, a QA system (e.g., QA system 105 in FIG. 1) may analyze a question and generate an answer to the question based on contextual information such as previous questions.

Figure 4:
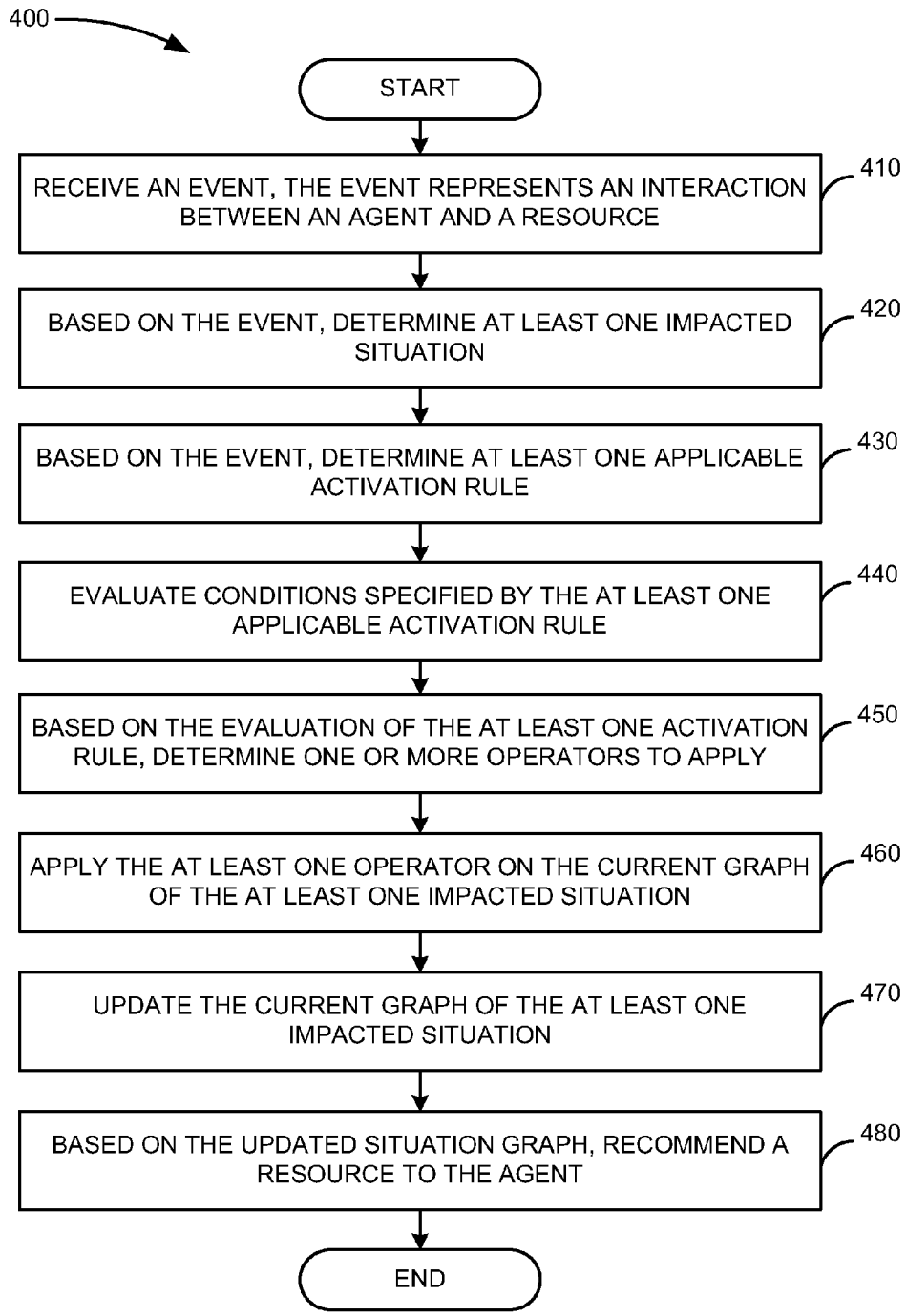
FIG. 4 is a flow diagram illustrating a process for recommending resource to agents in response to events, according to one embodiment.

One or more recommendations may be provided to an agent in response to an event, where the recommendations are based on the agent's situation. Thus, recommendations are adapted to users' needs based on their context and situation. FIG. 4 illustrates process 400 for recommending a resource to an agent in response to an event, according to one embodiment. The process starts at 410 with receiving an event. The event represents an interaction between an agent and a resource. In one embodiment, an event may be externally triggered, e.g. sent to recommender system 305 by client(s) 380 in FIG. 3. An example of externally triggered event is "Maggie reading document1". In this example, "Maggie" is an agent that is an external user and "document1" is a resource. Another example of externally triggered event may be entered question by a user. In yet another embodiment, an event may be internally triggered, e.g., by internal agents of recommender system 305. An example of internally triggered event is "OperatorX has processed document1". Accordingly, "OperatorX" is an internal agent program and "document 1" is a resource. In one embodiment, events may be described in RDF format.

At 420, at least one impacted situation is determined based on the event. Generally, situations of the subject "S" and the object "O" of the event situation statement are impacted if they are agents, e.g., the user agent "Maggie" in the above described example. At 430, at least one applicable activation rule is determined based on the event. In one embodiment, one or more of available activation rules, such as activation rules 370 in FIG. 3, are evaluated to determine their applicability to the event. An activation rule acts in response to specific events and triggers additional processing, if a set of conditions specified by the rule are met. In one embodiment, the structure of an activation rule may consist of an event, a condition and an action part. The event part of activation rules is used to filter events to which the activation rule reacts and thus trigger additional processing. Thus, event parts of available activation rules are evaluated to determine those rules responding to the received event. In one embodiment, activation rules may be implemented in RDF.

At 440, conditions specified by the at least one applicable activation rule are evaluated. Thus, the condition part of the event is evaluated. For example, such condition is "operatorB can be applied if 'operatorA has processed document1'". Other exemplar conditions are used as execution guards to prevent multiple executions of the same operator in the same situation. Examples of execution guards, include but are not limited to, "NOT(operatorA hasProcessed document1)", "EXISTS(opA hasProcessed document1)", and the like. In one embodiment, conditions may be evaluated by querying graph repository 340 in FIG. 3. For example, one or more of providers 322-326 may translate the condition part of an activation rule from RDF format to a SPARQL query to be executed over respective graphs 342-346 in graph repository 340, or over respective situation graph 362-364 (FIG. 3).

At 450, one or more applicable operators relevant to the event are determined based on the evaluation of the at least one activation rule. At 460, an operator from the determined one or more operators is applied on the current situation graph of the at least one impacted situation, if the conditions specified by the applicable rule are met. At 470, the current situation graph of the at least one impacted situation is updated. In one embodiment, as a result of processed operators, the updated situation graph may connect to situation graphs of other impacted agents. For example, a first user may comment on a document initially created by a second user. Thus, situation graphs of the first and the second user may connect in response to the event and the subsequently processed operators.

At 480, based on the updated situation graph of the at least one impacted situation, another resource is recommended to the agent. For example, the situation graph of the agent may be augmented with the situation statement "document2 is recommended to Maggie". In one embodiment, a link to the recommended "document2" may pop up. Thus, based on the situation of a user or other agent, personalized recommendation are enabled and adapted to dynamic behavior of the respective user or other agent. If there are more than one impacted situations, the steps 460-480 of process 400 are performed for each impacted situation.

In one embodiment, the at least one operator is a module that takes the event and the at least one impacted situation as input and, in response to the event, outputs an updated impacted situation. A situation may be updated by adding, updating or deleting situation statements. In one embodiment, the situation graph may be augmented or updated by adding situation statements representing an event such as "Maggie reading document1". In one embodiment, additional situation statements may be added to the situation graph in response to the processing of operations defined by the at least one operator, e.g. statements generated in response to the execution of a NER operator applied on an unstructured document. In one embodiment, operators may perform specific tasks or operations independently, or operators may be mutually dependent, e.g. an operator may be activated only if another operator has been already processed.

In one embodiment, a QA operator may be triggered in response to receiving a question posed by a user. The QA operator may invoke a QA system such as QA system 105 in FIG. 1 to generate an answer to the question. Answers to questions may be generated as recommendations. Furthermore, based on a situational recommender system such as recommender system 305 in FIG. 3, answers to questions may be recommended relevant to the users' situations and context.

Services and functionality provided by a QA system may be invoked by various clients that may be laptops, mobile devices, personal computers, servers, or other computer systems. Based on the situational management platform, users' situations may be shared between more than one computer systems and devices. Therefore, a user may switch between different devices without losing context history. For example, a user may enter follow-up questions from more than one device and it may refer to previously asked questions.

Generation of Context-Aware Answers

In one embodiment, answers to users' questions may be based on contextual information and users' situations. Examples of such contextual information include, but are not limited to, a user's social network, role in an organization, current location, previous questions, and the like. Context information helps resolving ambiguities in posed questions. In one embodiment, time and geography contextual information may be used to resolve ambiguities. For example, if the question posed is "What are the global sales revenue this year?", the QA system resolves the ambiguity to which year the user refers to, based on time contextual information. The explicit marker "this" may signal that context resolution of the question is required. Another kind of questions that may exhibit ambiguities may lack explicit marker, such as, "What about my sales revenue?". The QA system may determine based on contextual information that the intent of the user is to pose the question "What about my sales revenue in 2010 in Paris, France?" Another example of ambiguous questions may be questions comprising ambiguous markers, e.g., in the question "What about my recent sales revenue?" the marker "recent" is ambiguous. The QA system may determine how to interpret the "recent sales" based on context data.

In one embodiment, context information may include previously posed questions. A user may add a follow-up question to previously posed questions. The follow-up question makes reference to the previously posed questions. To illustrate, a user may pose the question "What is the revenue in France?", and then the user may enter a follow-up question such as "And in US?" to add additional filter to the previously posed question. As part of user's situation, posed questions may be retained. A QA system may analyze a question and generate an answer to the question based on previously posed questions.

In one embodiment, co-references may occur in a question. A co-reference occurs when multiple expressions in a question refer to the same entity or object. An expression is co-reference to another expression if they share the same referent. Ambiguities involving co-references could be resolved based on user's situation and contextual information.

Figure 5:
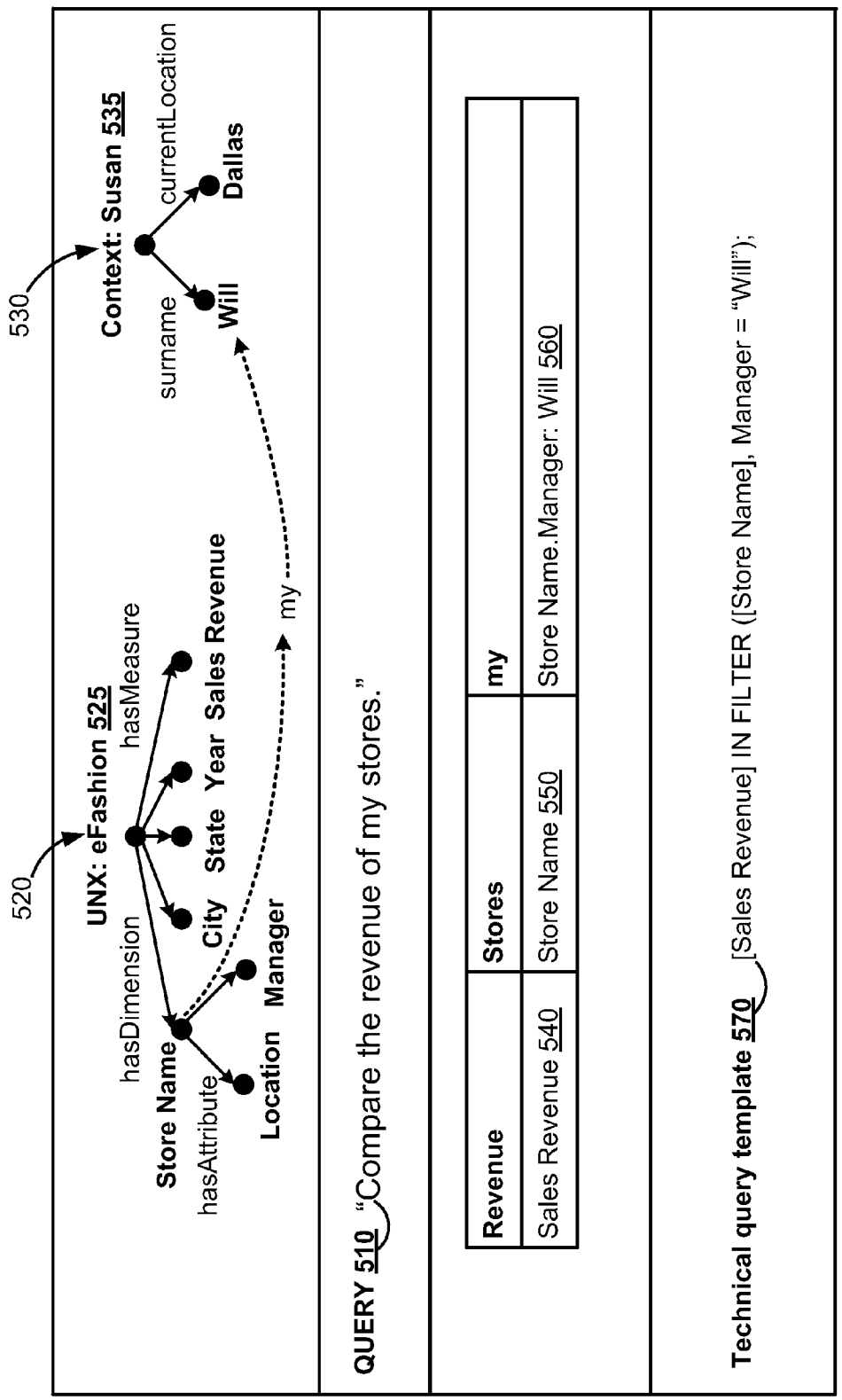
FIG. 5 is a diagram illustrating answer generation to query based on contextual information, according to one embodiment.

FIG. 5 illustrates answer generation to query 510 based on contextual information, according to one embodiment. Query 510 "Compare the revenue of my stores" is entered BI query to be answered by a QA system (e.g., QA system 105 in FIG. 1). Query 510 may be entered by user 535 "Susan". Contextual information and situation of user 535 is represented as situation graph 530. Graph 520 represents graph model of a semantic universe 525 "eFashion". Universe 525 "eFashion" defines data model objects that describe the underlying data source related to electronic fashion stores. To answer query 510, the QA system identifies that token "Revenue" refers to business entity 540 "Sales Revenue" and that token "Stores" refers to entity 550 "Store Name". To disambiguate in query 510 which stores are "my" stores, the QA system determines, based on situation graph 530, the surname "Will" of user 535. The QA system determines that in query 510 token "my" refers to business entity 560, i.e., store with name of the manager "Will". Thus, based on contextual information of user 535, the QA system matches the question to technical query template 570.

Figure 6:
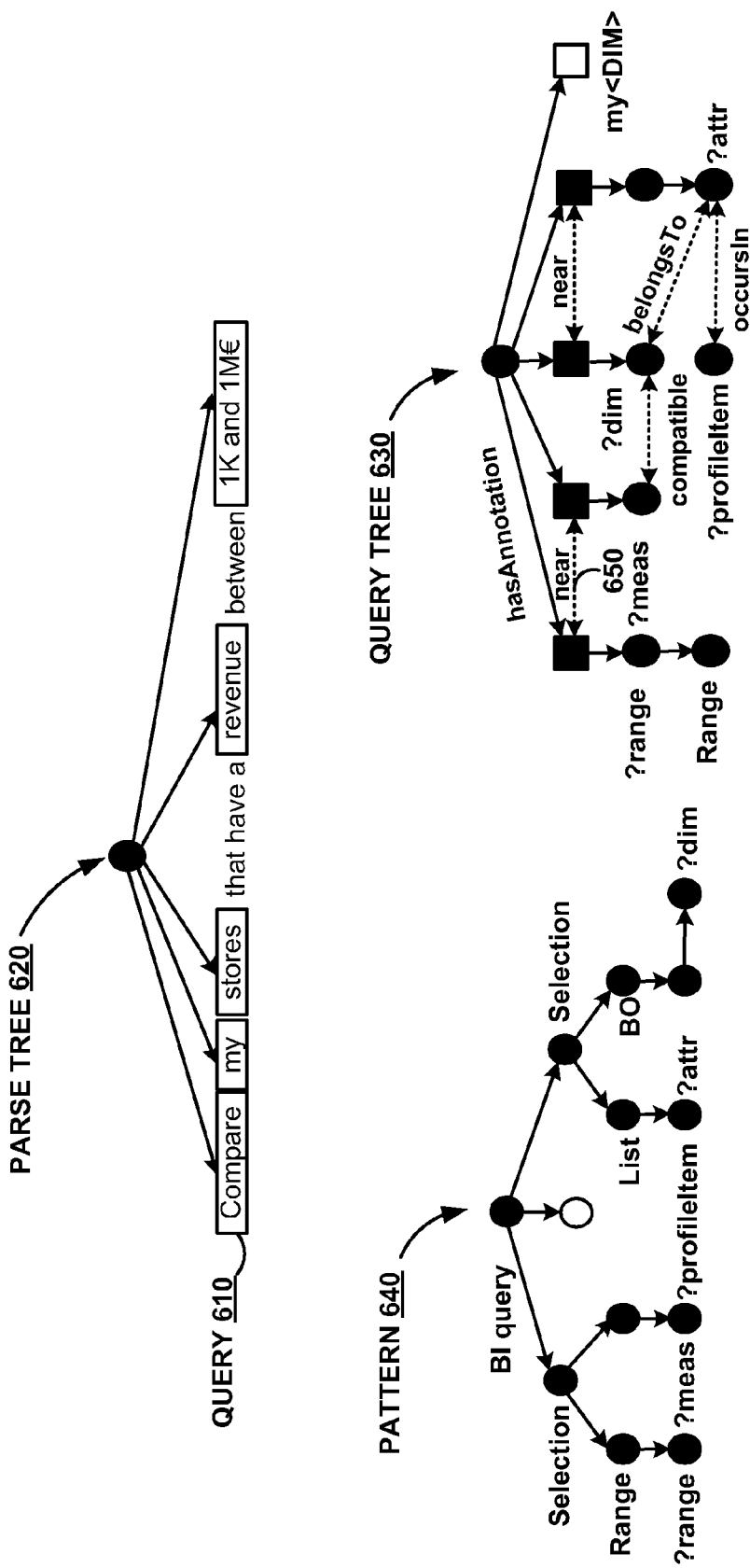
FIG. 6 illustrates exemplary query tree and exemplary pattern associated to the query tree, according to one embodiment.

FIG. 6 illustrates exemplary query tree 630 and exemplary pattern 640 associated to the query tree 630, according to one embodiment. Query 610 "Compare my stores that have revenue between 1K and 1M€" is an entered request for information to be answered by a QA system. Parse tree 620 is an exemplary parse tree generated as a result of parsing query 610. Parse tree 620 may represent syntactic structure of query 610. Query tree 630 represents parse tree 620 enriched with sematic annotations in accordance with method and techniques described herein. In one embodiment, semantic annotation may include attaching names, attributes, or other descriptions to a question. Query tree 630 may provide additional semantic, contextual information and metadata about identified entities and relationships between entities in query 610. For example, nodes of the query tree 630 may be labeled to represent the type of entities that are represented by the nodes. Relations between entities are represented as labeled edges of query tree 630 to show the type of relationships between the entities. In one embodiment, query tree 630 may include semantic annotations derived from or based on contextual information. For example, predicate 650 "near" represents a semantic relationship between two nodes of geographical type, where the semantic relationship is relative location. Entities represented by nodes in query tree 630 may be identified by URIs.

In one embodiment, query tree 630 may be generated by one or more of computer modules 132-144 in FIG. 1. Query tree 630 may be implemented in Resource Description Framework (RDF). Pattern 640 represents an exemplary pattern that may be associated to query tree 630. Pattern 640 may include a combination of one or more constraints such as projections, filters, sorting criteria clauses, truncation clauses, and the like. In one embodiment, pattern 640 may be implemented in SPARQL.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
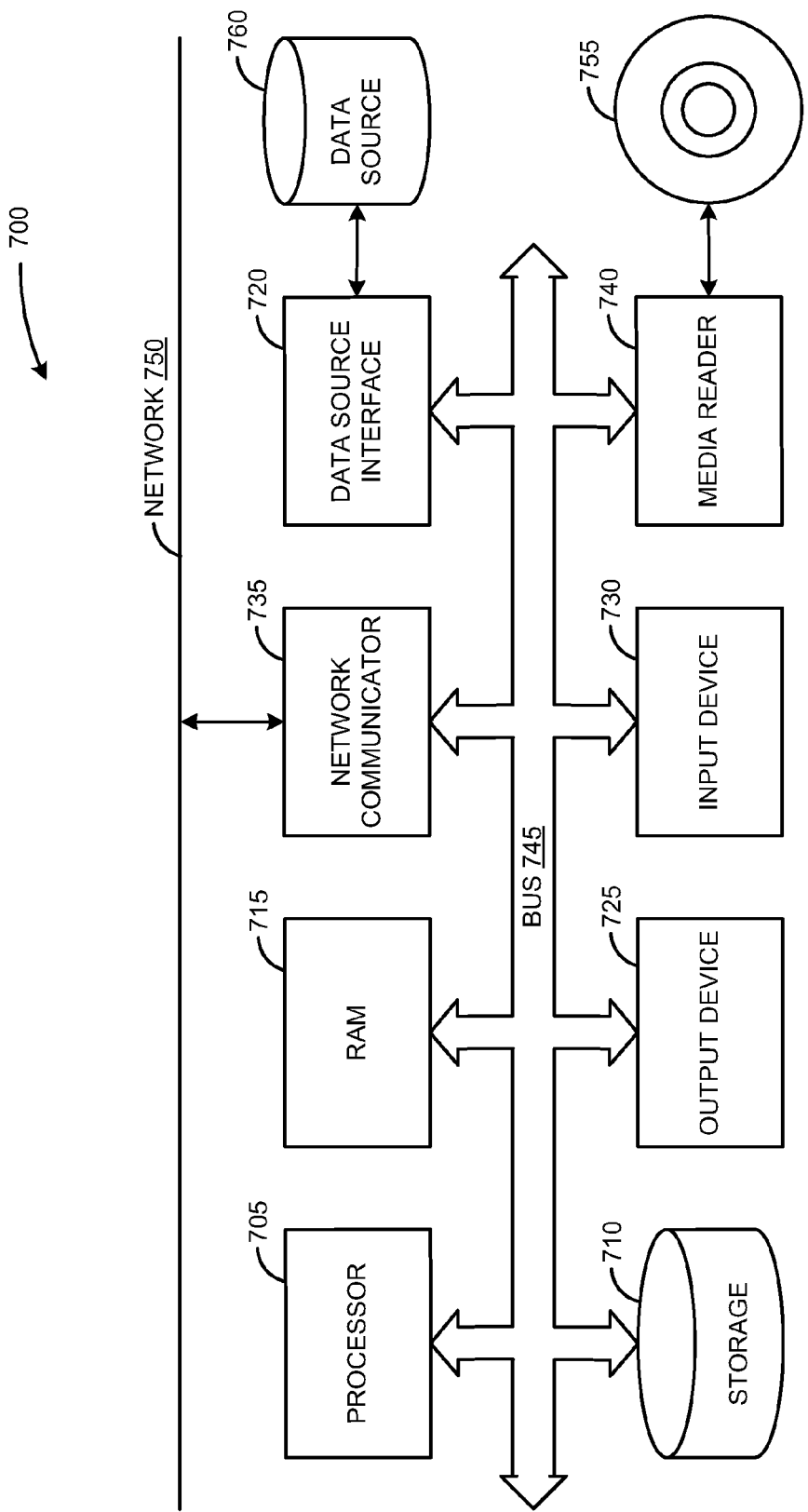
FIG. 7 is a block diagram illustrating a context-aware question answering computer system, according to one embodiment.

FIG. 7 is a block diagram of an exemplary computer system 700. The computer system 700 includes a processor 705 that executes software instructions or code stored on a computer readable storage medium 755 to perform the above-illustrated methods of the invention. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:
1. A computer implemented method to generate an answer to a business intelligence (BI) request for information, the method comprising:
receiving the BI request for information expressed in natural language, the BI request is sent by an agent;

upon receiving the BI request, loading into a memory a situation graph of the agent, the situation graph representing information contextual to the agent;

parsing the BI request;

based on the parsed BI request, generating a graph representing syntactic structure of the received BI request;

enriching the graph based on the parsed BI request with:
- at least one semantic annotation representing at least one business object identified in the BI request, the business object included in a data model that at least in part forms a semantic layer of a plurality of data sources, the data model determines a structure of at least one data source from the plurality of data sources, and
- at least one semantic annotation representing contextual information derived from the situation graph of the agent;

matching the parsed BI request to a pattern from a plurality of patterns of features included in the BI request, wherein features of the pattern include reference to the at least one business object identified in the BI request;

processing by the computer a technical query associated with the pattern from the plurality of patterns to retrieve data relevant to the BI request at least from the at least one data source generating the answer to the BI request based on the retrieved data relevant to the BI request and based at least in part on the situation graph of the agent, wherein the answer generated by triggering at least one operator of a situational recommender system; and recommending the generated answer.

2. The method of claim 1, wherein recommending the answer further comprises:
creating a visualization of the answer based on the retrieved data.

3. The method of claim 1, further comprising:
generating an answer to a follow-up request for information, wherein the follow-up request for information refers to the BI request for information.

4. The method of claim 1, further comprising:
ranking one or more generated answers, and
adding the ranked one or more answers to the situation graph of the agent, wherein the one or more answers correspond to the BI request for information.

5. The method of claim 1, wherein recommending the answer further comprises:
resolving ambiguities in the BI request for information based on the situation graph of the agent.

6. A question-answering computer system to generate an answer to a business intelligence (BI) request for information, the system including:
at least one processor and memory to execute program code related to:
receive the BI request for information expressed in natural language, the BI request is sent by an agent;
upon receiving the BI request, loading into a memory a situation graph of the agent, the situation graph representing information contextual to the agent;
parse the BI request;
based on the parsed BI request, generate a graph representing syntactic structure of the received BI request;
enrich the graph based on the parsed BI request:
at least one semantic annotation representing at least one business object identified in the BI request, the business object included in a data model that at least in part forms semantic layer of a plurality of data sources, the data model determines a structure of at least one data source from the plurality of data sources,
at least one semantic annotation representing contextual information derived from the situation graph of the agent;
match the parsed BI request to a pattern from a plurality of patterns of features included in the BI request, wherein features of the pattern include reference to the at least one business object identified in the BI request;
process by the computer a technical query associated with the pattern from the plurality of patterns to retrieve data relevant to the BI request at least from the at least one data source;
generate the answer to the BI request for information based on the retrieved data relevant to the BI request and based at least in part on the situation graph of the agent, wherein the answer generated by triggering at least one operator of a situational recommender system; and
recommending the generated answer.

7. The system of claim 6, wherein recommending the answer further comprises:
rendering a visualization of the answer based on the retrieved data.

8. The system of claim 6, further comprising:
generating an answer to a follow-up request for information, wherein the follow-up request for information refers to the BI request for information.

9. The system of claim 6, further comprising:
ranking one or more generated answers, and
adding the ranked one or more answers to the situation graph of the agent, wherein the one or more answers correspond to the BI request for information.

10. The system of claim 6, wherein recommending the answer further comprises:
resolving ambiguities in the BI request for information based on the situation graph of the agent.

11. A non-transitory computer readable medium storing instructions thereon, which when executed by a processor cause a computer system to:
receive a business intelligence (BI) request for information expressed in natural language, the BI request is sent by an agent;
upon receiving the BI request, loading into a memory a situation graph of the agent, the situation graph representing information contextual to the agent;
parse the BI request;
based on the parsed BI request, generate a graph representing syntactic structure of the received BI request;
enrich the graph based on the parsed BI request with:
at least one semantic annotation representing at least one business object identified in the BI request, the business object included in a data model that at least in part forms a semantic layer of a plurality of data sources, the data model determines a structure of at least one data source from the plurality of data sources, and
at least one semantic annotation representing contextual information derived from the situation graph of the agent;
match the parsed BI request for information to a pattern from a plurality of patterns of features included in the BI request, wherein features of the pattern include reference to the at least one business object identified in the BI request;

process by the computer a technical query associated with the pattern from the plurality of patterns to retrieve data relevant to the BI request at least from the at least one data source;

generate the answer to the BI request based on the retrieved data relevant to the BI request and based at least in part on the situation graph of the agent, wherein the answer generated by triggering at least one operator of a situational recommender system; and recommending the generated answer.

12. The non-transitory computer readable medium of claim 11, further comprising:

generating an answer to a follow-up request for information, wherein the follow-up request for information refers to the BI request for information.

13. The non-transitory computer readable medium of claim 11, further comprising:

ranking one or more generated answers, and adding the ranked one or more answers to the situation graph of the agent, wherein the one or more answers correspond to the BI request for information.

14. The non-transitory computer readable medium of claim 11, wherein recommending the answer further comprises:

resolving ambiguities in the BI request for information based on the situation graph of the agent.

* * * * *